United States Patent [19]
Berlebner et al.

[11] Patent Number: 4,565,253
[45] Date of Patent: Jan. 21, 1986

[54] COMPUTERIZED COMBINATION WEIGHER WITH PRESET OPTIMUM WEIGHER DISCHARGE

[75] Inventors: James A. Berlebner, Sugarland; Charles J. Reifel, Houston, both of Tex.

[73] Assignee: Penta-Pak Inc., Houston, Tex.

[21] Appl. No.: 574,296

[22] Filed: Feb. 3, 1984

[51] Int. Cl.$^4$ .................. G01G 19/00; G01G 19/22; G01G 13/02
[52] U.S. Cl. ........................... 177/1; 177/25; 177/123
[58] Field of Search ............... 177/1, 25, 50, DIG. 12, 177/123

[56] References Cited

U.S. PATENT DOCUMENTS

| | | | |
|---|---|---|---|
| 3,706,375 | 12/1972 | Raue | 177/50 X |
| 4,344,492 | 8/1982 | Hirano | 177/25 |
| 4,398,612 | 8/1983 | Mikami et al. | 177/25 |
| 4,418,771 | 12/1983 | Henry et al. | 177/25 X |
| 4,446,937 | 5/1984 | Asai | 177/1 |

Primary Examiner—E. A. Goldberg
Assistant Examiner—Patrick W. Foster
Attorney, Agent, or Firm—Larson and Taylor

[57] ABSTRACT

A method and apparatus for weighing product for delivery to a package is disclosed. Product is fed from a main conveyor to a plurality of secondary conveyors, each of which is provided with an individual weighing station. Each weighing station includes upper and lower weighing units, each weighing unit comprising a gated hopper and a weighing cell. A local computer is provided at each weighing station and all of the local computers are connected to a main computer. In operation the upper weighing unit of each weighing station is set at a different predetermined fraction of the total desired package weight and when sufficient product is delivered to the upper weighing head of each weighing station the conveyor to such weighing station is stopped and the weighed product is delivered to the lower weighing head where the weight is checked. The main computer calculates the combination of weights in each weighing station to determine the combination most nearly equal to but not less than the desired final package weight. The fractional weights at which each weighing head is set may be adjusted up or down dependent upon the number of weighing stations utilized to make up the final package weight.

8 Claims, 4 Drawing Figures

COMPUTERIZED COMBINATION WEIGHER WITH PRESET OPTIMUM WEIGHER DISCHARGE

The present invention relates to a method and apparatus for weighing product to be delivered to an open package.

There have been numerous attempts to increase the accuracy of weighing product to be delivered to open packages in connection with the use of packaging machines known as form, fill and seal machines. It is essential that the number of underweight packages be reduced as close to zero as possible and still minimize the number of substantially overweight packages. In the use of form, fill and seal packaging equipment it is also essential to weight and deliver the product to the open package as quickly as possible.

One such method and apparatus for providing accurate weights expeditiously is disclosed in U.S. Pat. No. 3,939,928, issued Feb. 24, 1976. In this system a plurality of weighing heads are provided and the time of delivery of product of each of these weighing heads is varied so that each of the weighing heads receives a different quantity of product. The weight in each of the weighing heads is transmitted to a central computer which calculates the combination of weights of products in each of the weighing heads which most nearly equals the desired package weight. However, due to variations in the amount of product delivered by the conveyor to the weighing head it is not possible to accurately predict the amount of product delivered to each weighing head for a predetermined time period. Thus, wide flucuations in the weight of product received by each weighing head are experienced when operating with the method and apparatus described in the aforementioned patent.

According to the present invention there is provided a method and apparatus for accurately obtaining exact package weights. There is provided a plurality of weighing stations, each weighing station including an upper and lower weighing unit and wherein precise predetermined fractional portions of the desired final weight are obtained in each weighing station. Each weighing station has the upper weighing unit set to receive a different fractional portion of the desired final weight. When this fractional weight is reached by the upper weighing unit the feed conveyor to that unit is stopped and the product is delivered to the lower weighing unit where the weight is checked. The check weight value is then transmitted to a central computer which then sums the weights from the various weighing stations and determines that combinations of weights which is not less than but most closely equal to the desired final package weight.

The apparatus includes a main feed conveyor which delivers product to a central cone shaped disc which in turn delivers the product to secondary feed conveyors surrounding the central disc. The cone shaped disc may be orbitally moved so as to deliver product to the various secondary feed conveyors more evenly. Means is provided for determining the product buildup on the cone shaped disc so that the main feed conveyor may be shutoff when the heighth of product on the central disc reaches a predetermined value. Each of the weighing stations includes a pair of hoppers disposed one above the other and each weighing station includes two weighing units and a built in computer to provide information to the central computer as well as to control the cutoff signals to the secondary conveyors and operating signals to the gates on the weighing hoppers. The weighing stations may be readily removed from the apparatus and the delivery tube to the open package is centrally located and readily accessible by removal of the weighing stations.

An object of the present invention is to provide a method and apparatus for achieving a high degree of accuracy in the weight of product delivered to a package.

Further object of the present invention is to provide a method and apparatus for weighing a plurality of predetermined fractional portions of a desired final package weight and determining the combination of such predetermined fractional weights most nearly equal to but not less than the desired final package weight.

Other objects and many of the intended advantages of the present invention will be apparent upon consideration of the following detailed specification and drawings.

Figure 2:
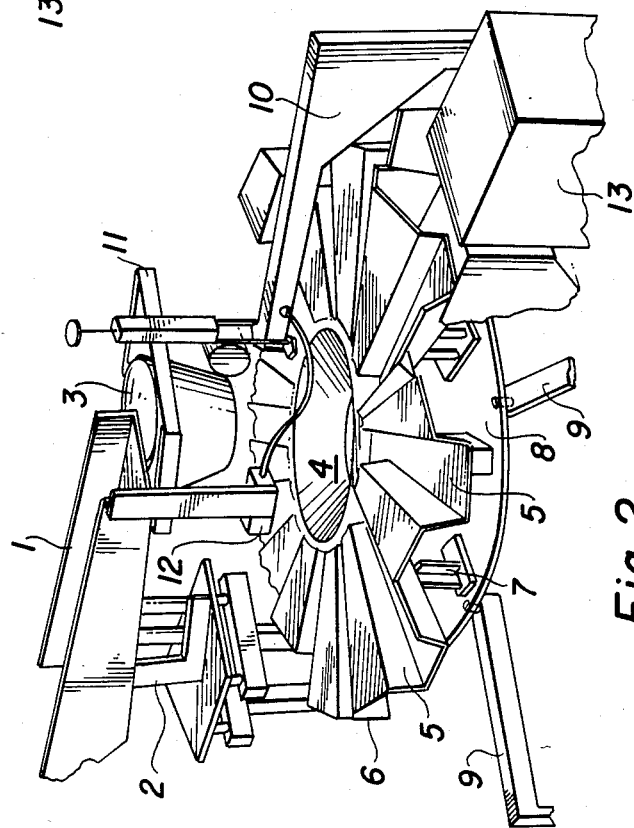
FIG. 2 is a perspective view of the feed conveyors to the individual weighing stations.

Referring now more specifically to the drawings wherein like numerals refer to like parts throughout the several views, there is shown at 1 in FIG. 2 a main feed conveyor which is provided with a vibrator 2 for delivering product from a feed belt (not shown) at the outer end of the conveyor to a central funnel 3. The funnel 3 delivers the product to a central cone shaped disc 4 which may be mounted for orbital movement beneath the funnel 3. Surrounding the periphery of the disc 4 are a plurality of individual secondary feed conveyors 5 each of which has outwardly extending flanges 6 which overlie the flanges on adjacent secondary feed conveyors. These conveyors are driven by vibratory motors such as shown at 7 to deliver product from their inner ends to the outer ends.

It can be seen that the vibratory motor 7 and secondary conveyors 5 are mounted on a central platform 8 which is in turn supported by brackets 9 which form part of the main frame of the apparatus. Similarly, a bracket 10 having frame 11 on the outer end thereof supports the funnel 3 beneath the outlet of the main feed conveyor 1.

There is also shown in FIG. 2 a photoelectric scanner 12 which serves to measure the depth of product accumulating on disc 4 and to shutoff the vibratory motor 2 delivering product on main feed conveyor 1 when the depth of product reaches a predetermined value. It is also possible to measure the depth of product on cone shaped disc 4 ultrasonically by means disposed at the upper end of funnel 3.

Figure 3:
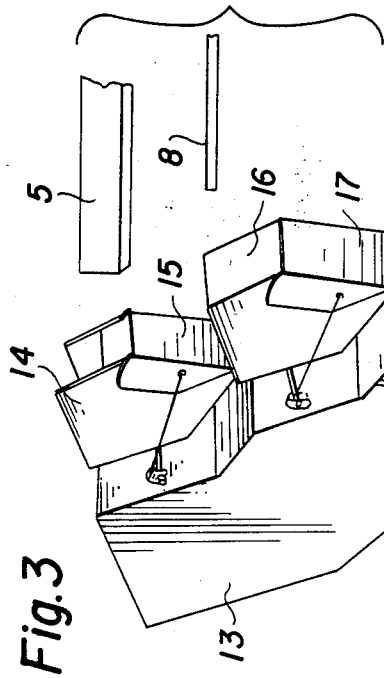
FIG. 3 is a perspective view of a weighing station tilted from its operative position.

A weighing station 13 is provided at the outer end of each of the secondary feed conveyors 5. One such weighing station is shown in each of FIGS. 2, 3 and 4. As can be seen in FIG. 3, each weighing station is provided with an upper hopper 14 which receives product from the outer end of secondary feed conveyor 5. This hopper is operatively connected with an upper weighing head located within the cabinet 13. A hinged gate 15 is provided on the lower end of hopper 14 for delivery of product from hopper 14 into hopper 16. Hopper 16 is likewise connected with a weighing system disposed within cabinet 13 which is entirely independent of the weighing suspension for hopper 14. A hinged gate 17 is provided for delivery of product from hopper 16 into a delivery chute 18.

Figure 4:
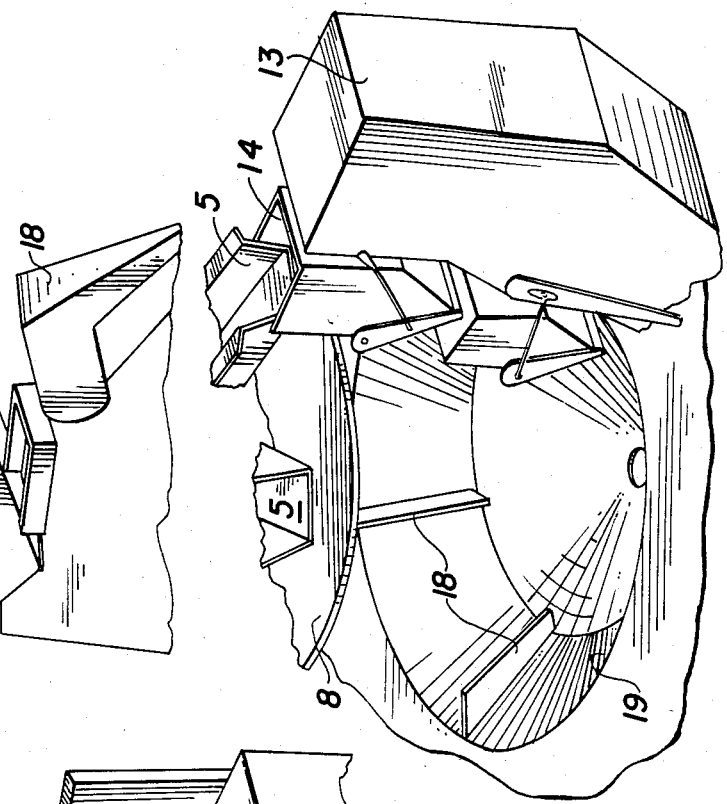
FIG. 4 is a perspective view of a weighing station and the delivery tube to deliver product to a package.

In FIG. 4 the weighing station 13 is shown in its normal operative position with the hopper 14 disposed immediately below the outer end of the secondary feed conveyor 5. The weighing stations 13 are mounted so that they can be easily tilted back for easy access to the hoppers and related structure.

It is to be noted that the chutes 18 which deliver product from the lower hoppers of the weighing stations are located around the periphery of a delivery tube 19 disposed immediately below the central platform 8. By tilting back or removing the weighing stations 13 access to the central delivery tube is facilitated for cleaning purposes and the like.

Figure 1:
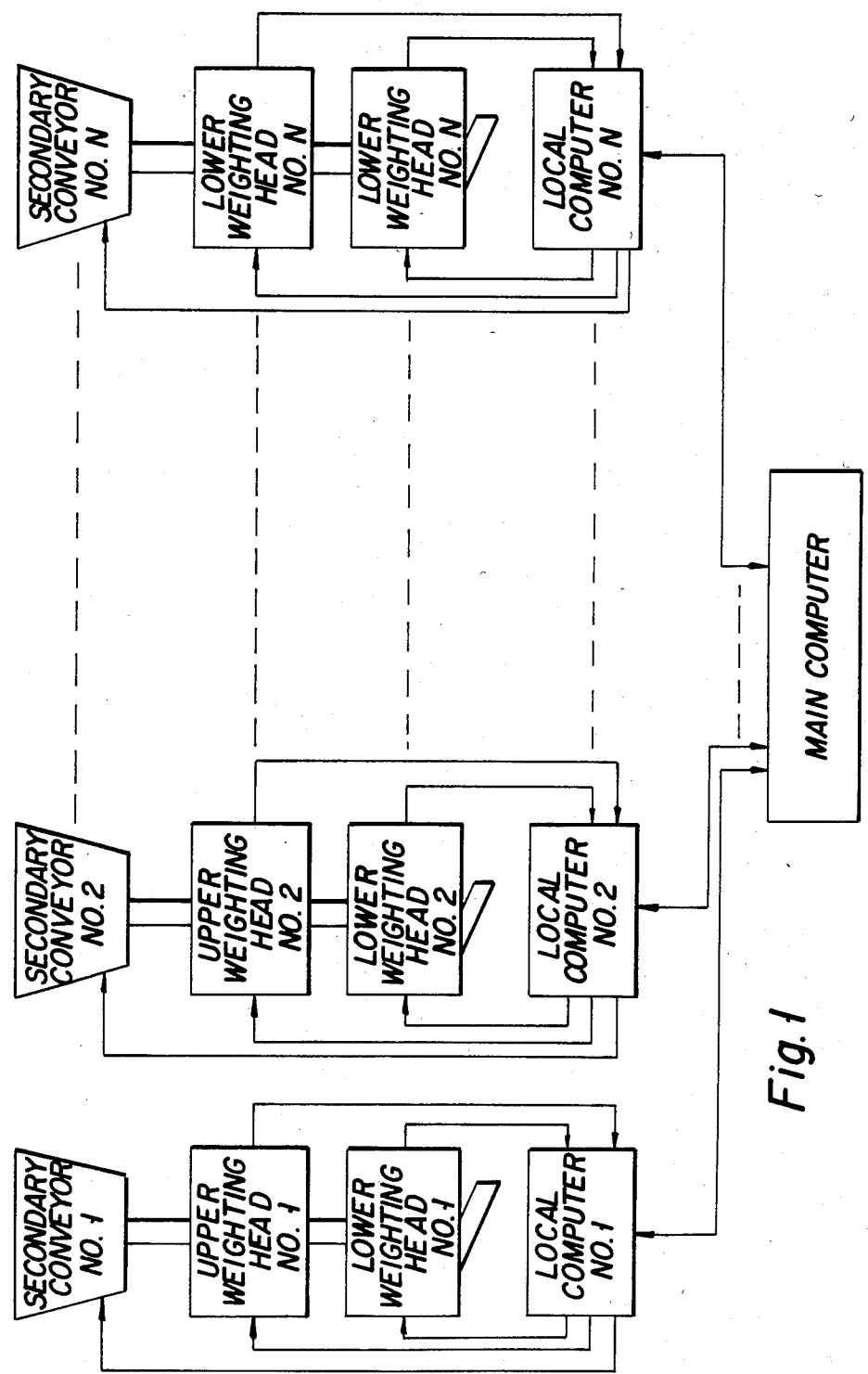
FIG. 1 is a block diagram showing the input and output signals to the main computer and to the computers located in each weighing station.

Referring now to FIG. 1 there are shown three secondary conveyors and weighing stations in block form. There may be any number of weighing stations provided and in one embodiment ten such stations are provided, each station being identical and containing an upper weighing head, lower weighing head and local computer. The double lines show the flow of product from the secondary conveyor to the upper weighing head and from the upper weighing head to the lower weighing head from which the product is delivered to a package. The main computer provides instructions to each of the local computers so that the weight set for each upper weighing head is at a different fraction of the total desired package weight. For example, for a sixteen ounce desired final package weight, the first upper weighing head could be set for ten ounces, the second weighing head for eight ounces, the third weighing head for four ounces the fourth weighing head for two ounces, the fifth weighing head for one ounce, the sixth weighing head for one-half ounce, the seventh weighing head for one-quarter ounce, the eighth weighing head for one-eighth ounce, the ninth weighing head for one-sixteenth ounce and the tenth weighing head for one-thirtysecondth ounce. Product is delivered along the secondary conveyors and continues until the product delivered to the upper hopper in each weighing station reaches the predetermined fractional value of the desired final weight for which that weighing unit is set. At that point, the vibratory feeder for the secondary conveyor delivering product to that weighing unit is shut off and the product in the upper hopper is dumped into the lower hopper where the weight is checked. The checked weight is then fed back to the main computer and the main computer determines which particular combination of weights most accurately totals the desired final package weight. When that determination is made the product from the selected weighing stations is delivered to the central delivery tube and into the open package disposed at the lower end of the delivery tube. The cycle is then recommenced with only those weighing stations which delivered product for the preceeding package being refilled for the next succeeding package.

The main computer determines the number of weighing stations which deliver product to make up the desired weight and if the number of such stations exceeds a predetermined number, for example, four, the computer will set up the weights measured by the upper weighing heads so as to reduce the number of stations required to make up the final package weight. In the event the number of weighing stations delivering product for a single package is less than a predetermined number, for example, four, then the computer will reduce the weight set for each upper weighing head so as to increase the number of weighing stations delivering product for a single package. By this means a method and apparatus is provided for obtaining exceedingly accurate package weights on a consistant basis.

Obviously many modifications and variations of the present invention are possible in light of the above teachings.

What is claimed as new and is desired to be secured by Letters Patent is:

1. A method of weighing product for packaging comprising the steps of providing a plurality of weighing stations comprising pairs of upper and lower weighing units, setting the weight on each of the upper weighing units of each weighing station at a different fraction of the desired package weight, delivering product to the upper weighing unit of each weighing station until the fractional weight of the desired package weight at which each upper weighing unit is set is reached, transferring the product from the upper weighing unit to the lower weighing unit in each weighing station for check weighing, and selecting that combination of weighing stations having fractional package weight most nearly equal to but not less than the desired final package weight for delivering of product to the open package presetting an optimal number of weighing stations delivering product to a single open package, comparing the optimal number with the actual number of weighing stations delivering product to the open package and, when the optimal number is less than the actual number, increasing the fractional weight at which each of the upper weighing units is set and, when the optimal number exceeds the actual number, decreasing the fractional weight at which each of the upper weighing units is set.

2. A method of weighing product for packaging according to claim 1 wherein the step of delivering product to the upper weighing unit of each weighing station includes the steps of feeding product from a central main conveyor to a central cone shaped disc and feeding product from the disc to a plurality of secondary conveyors.

3. An apparatus for delivering weighed quantities of product comprising a main feed conveyor, a plurality of secondary feed conveyors, a plurality of weighing stations, each of said weighing stations comprising an upper and lower weighing unit, each weighing unit including an gated hopper for receiving product and a weighing cell for weighing product in said hopper, means for setting the weight on each of said upper weighing units at a different fraction of the desired total package weight, means for transferring the product from the upper weighing unit to the lower weighing unit for check weighing, means for selecting that combination of weighing stations having package weights most nearly equal to but not less than the desired final package weight for delivery of product to an open package, means for presetting an optimal number of weighing stations delivering product to a single open package, means for comparing the optimal number of weighing stations with the actual number of said selected combination of weighing stations and means for increasing the fractional weight at which each of the upper weighing units is set in the event the actual number exceeds the optimal number and means for decreasing the fractional weight at which each of the upper weighing units is set in the event the actual number is less than the optimal number.

4. An apparatus according to claim 3 and further including a funnel and a cone shaped disc disposed between said main feed conveyor and said plurality of secondary feed conveyors for distributing product from said main feed conveyor to said secondary feed conveyors.

5. An apparatus according to claim 4 and further including means for measuring the depth of product on said disc and means for stopping the main conveyor feed when the product on said disc reaches a predetermined depth.

6. An apparatus according to claim 3 wherein said secondary feed conveyors have overlapping flanges surrounding said cone shaped disc.

7. An apparatus according to claim 6 wherein said weighing stations are disposed circumferentially around the outer ends of said secondary feed conveyors.

8. An apparatus according to claim 3 and further including a central delivery tube disposed beneath said disc for receiving product from the hopper of the lower weighing unit of all of said weighing stations.

* * * * *